United States Patent [19]

Nakajima

[11] Patent Number: 4,649,448

[45] Date of Patent: Mar. 10, 1987

[54] THIN FILM MAGNETIC HEAD HAVING A SLIDING SURFACE

[75] Inventor: Hiroyasu Nakajima, Odawara, Japan

[73] Assignee: Hitachi, Ltd., Tokyo, Japan

[21] Appl. No.: 616,814

[22] Filed: Jun. 4, 1984

[30] Foreign Application Priority Data

Jun. 3, 1983 [JP] Japan .................................. 58-97797
Jun. 3, 1983 [JP] Japan .................................. 58-97798

[51] Int. Cl.$^4$ ............................ G11B 5/14; G11B 5/22
[52] U.S. Cl. ...................................... 360/122; 360/103; 360/125; 360/127
[58] Field of Search ................. 360/122, 103, 125, 127

[56] References Cited

U.S. PATENT DOCUMENTS

| | | | |
|---|---|---|---|
| 4,317,147 | 2/1982 | Daughenbaugh et al. | 360/122 |
| 4,409,633 | 10/1983 | Watanabe et al. | 360/122 |
| 4,430,440 | 2/1984 | Wada et al. | 360/122 |
| 4,441,132 | 4/1984 | Morita et al. | 360/122 |

FOREIGN PATENT DOCUMENTS

0089915 7/1980 Japan .................................. 360/122
0137516 10/1981 Japan .................................. 360/122

OTHER PUBLICATIONS

Groben et al., "Wear Coating for a Tape Head", I.B.M. Tech. Disc. Bull., vol. 9, No. 9, Feb. 1967, p. 1085.

*Primary Examiner*—Robert S. Tupper
*Attorney, Agent, or Firm*—Antonelli, Terry & Wands

[57] ABSTRACT

In a thin film magnetic head having a thin film on a substrate to form a magnetic circuit associated with a recording medium, a sliding surface of the substrate opposing the recording medium is made of a material; namely, $ZrO_2$, having a coefficient of thermal conductivity which is sufficient to carbonize a binder of the recording medium when the magnetic head slides on the recording medium, so that a carbonized material can afford to provide good slidability of the recording medium against the magnetic head and life of the thin film magnetic head and recording medium can be prolonged.

3 Claims, 5 Drawing Figures

THIN FILM MAGNETIC HEAD HAVING A SLIDING SURFACE

BACKGROUND OF THE INVENTION

The present invention relates to thin film magnetic heads and more particularly to a thin film magnetic head suitable for a magnetic tape or magnetic disc memory device in which the magnetic head comes into contact with a recording medium.

With recent trend to increasing density of magnetic recording, popularity of the magnetic head is shifting from a conventional bulky monolithic type magnetic head to a thin film magnetic head having excellent high frequency characteristics.

FIG. 1 shows one example of a thin film magnetic head for use in a magnetic tape memory device. One substrate 1 formed with a thin film head element 2 opposes the other substrate 1 also formed with a thin film head element 2 with a magnetic shielding plate 3 interposed therebetween, and a resultant laminated assembly is clamped to a frame 4. For transmission and reception of signals, either thin film head element 2 is connected with lead conductors 5 formed on a flexible printed sheet. Because of a thin film structure, magnetic material of the thin film magnetic head is prone to magnetic saturation and the length of magnetic path cannot be increased. Therefore, the magnetic gap depth cannot be so large as that for the conventional head. In such a thin film magnetic head, there arises a problem that the tip portion of the magnetic head in contact with the recording medium tends to wear. Therefore, it has hitherto been proposed to use a highly wear-proof sintered member of $Al_2O_3 \cdot TiC$ as the substrate formed with the thin film head element.

However, this material disadvantageously has poor slidability against the recording medium and lacks reliability. It will therefore follow that with the use of the $Al_2O_3 \cdot TiC$ sintered member as the substrate 1 of FIG. 1, a portion of the substrate 1 forms a surface being in contact with the magnetic tape, thereby succeeding in suppressing wear of the magnetic head; whereas the poor slidability attended with sliding friction generates heat by which a magnetic tape binder is softened, with the result that the softened binder tends to adhere to the magnetic head by accident. This imposes a fatal problem on reliability.

A similar problem is encountered in the magnetic disc memory device. More particularly, with the increasing density of magnetic recording, the gap (flying height) between the magnetic disc and the magnetic head is so decreased that the magnetic head frequently comes into contact with the magnetic disc during sliding, resulting in tendency toward a trouble that is so-called head crash.

To eliminate these disadvantages, one measure adapted for the magnetic disc is to coat an air bearing surface of a slider with a highly lubricative material, and another measure also adapted for the magnetic disc is to impregnate a liquid lubricant in porous voids inherently formed in a sintered polycrystalline member standing for the slider. Many approaches to these measures have been proposed. For example, Japanese Patent Application Laid-open No. 111,166/81 proposes a method of embedding lap materials of, for example, Sn in the porous voids in the slider, Japanese Patent Application Laid-open No. 47,956/81 a method of impregnating fluorine resin in the porous voids in the slider, Japanese Patent Application Laid-open No. 107,326/81 a method of impregnating polyvinyl alkyl ether in the porous voids in the slider or coating the voids with the same substance, and Japanese Patent Application Laid-open No. 169,264/81 a method of impregnating fluorine polymer, alkyl ester or the like in the voids.

All of the proposals intend to apply impregnation or coating of the highly lubricative materials to the air bearing surface of the slider and are surely successful from the standpoint of improving the slidability. However, if the lubricant is coated to an appreciable thickness which is sufficient to meet only the requirement for slidability, then the effective gap between the slider and the recording medium will be decreased, adversely affecting the sliding operation. To obviate this inconvenience, if the gap is increased, this expanded gap between the magnetic head and the recording medium will have an adverse effect on the magnetic recording operation. If, for elimination of this disadvantage, a thin coating is applied, then its effect will be nullified rapidly, resulting in impairment of the promising improvement of the slidability. With the impregnation of the lubricant in the porous voids in the slider, an improvement in the slidability is expected on the one hand but it happens on the other hand that the head adheres to the recording medium. This phenomenon is observed in a disc device of the contact-start-stop type. For example, when the disc device continues to stop operating for about half a day, lubricants impregnated in large size voids ooze out, on account of their surface tension, to occupy a gap between the head and the recording medium, thereby causing the adhesion phenomenon. In order to prevent this adhesion phenomenon, not only the number and size of the porous voids in the slider must be controlled purposely but also the viscosity and quantity of the liquid lubricant must be selected. To this end, an extremely sophisticated technique is required.

SUMMARY OF THE INVENTION

An object of this invention is to provide a thin film magnetic head having excellent slidability against a recording medium such as a magnetic tape or a magnetic disc.

Another object of this invention is to provide a thin film magnetic head having excellent slidability against a recording medium such as a magnetic tape or a magnetic disc and excellent wear-proof properties.

Still another object of this invention is to provide a substrate for a thin film magnetic head having, in addition to excellent slidability against a recording medium such as a magnetic tape or a magnetic disc, excellent wear-proof properties and rigidity as well as good chemicals-proof and mechanical machining properties.

According to this invention, in a thin film magnetic head having a thin film on a substrate to form a magnetic circuit associated with a recording medium, at least a surface of the substrate opposing the recording medium is made of either a material having a coefficient of thermal conductivity which is sufficient to carbonize a binder of the recording medium when the magnetic head slides on the recording medium or a material having a coefficient of thermal conductivity which is sufficient to prevent the binder of the recording medium from being softened when the magnetic head slides on the recording medium. The coefficient of thermal conductivity sufficient to carbonize the binder of the recording medium measures 0.03 cal/cm·sec·°C. or less and $ZrO_2$ (zirconia) is considered as an exemplary material having this coefficient of thermal conductivity. The coefficient of thermal conductivity sufficient to prevent softening of the recording medium binder measures 0.1 cal/cm·sec·°C. or more and SiC based ceramics are considered as an exemplary material having this coefficient of thermal conductivity. These materials may be added, as necessary, with a material having excellent wear-proof properties, rigidity, chemicals proof properties or mechanical machining properties.

DESCRIPTION OF THE PREFERRED EMBODIMENTS

Figure 1:
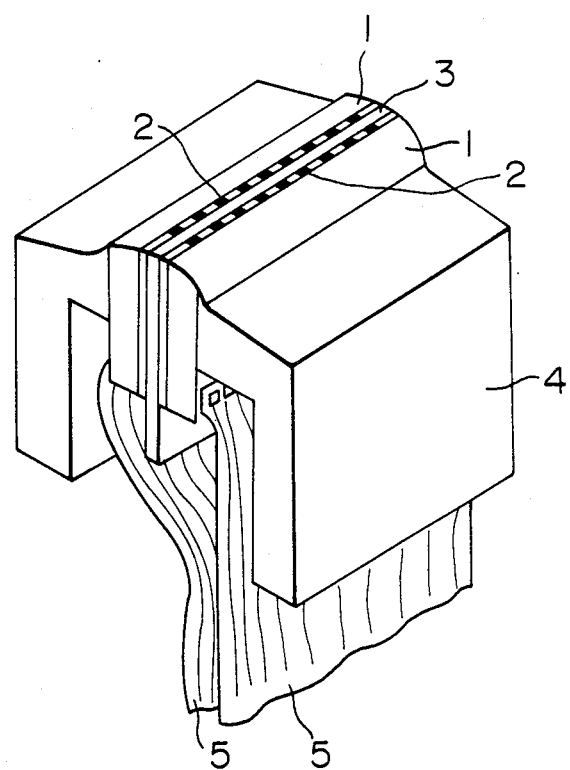
FIG. 1 is a schematic perscpective view of a thin film magnetic head for use in a magnetic tape memory device.
Figure 2:
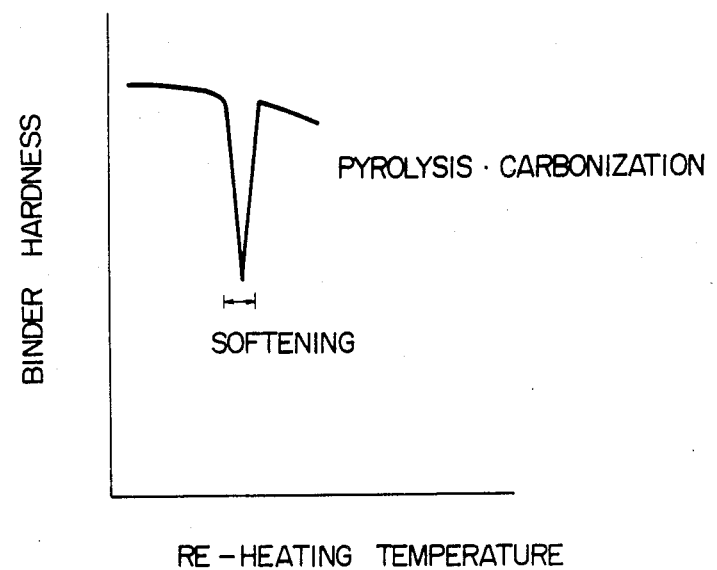
FIG. 2 is a graph showing a general heat dependent properties of the binder of the recording medium.

The point of a first embodiment of the present invention will be described in view of physical phenomena taking place therein. Generally, a binder is set or hardened by heating it to a predetermined temperature so as to be applied to a magnetic tape or a magnetic disc. When the binder is once cooled to room temperature and then re-heated, it is softened within a temperature range as shown in FIG. 2. Illustrated in FIG. 2 is the relation between re-heating temperature and hardness of the binder. When heated to temperatures exceeding the softening temperature range, the binder undergoes a pyrolysis and is carbonized or calcified. The inventors of this invention have found that the existence of the softening temperature range for the binder is of significance in studying the sliding phenomenon.

Heat is generated by the sliding friction between the magnetic tape or disc and the magnetic head, as described previously. When this heat generation causes the binder surface of the magnetic tape on disc to rise to a high temperature, the binder behaves in two modes as described hereinafter. In the first mode, the binder undergoes less heat dissipation to raise its temperature to a great extent and is carbonized ultimately, in the event that ceramics such as $ZrO_2$ having a small coefficient of thermal conductivity (0.005 cal/cm·sec·°C.) is used for the substrate. In effect, experiments show that in the case of the $ZrO_2$ substrate, the binder surface is blackened and carbonization in progress is evidenced through infrared analysis. Under this condition, the carbonized material or carbide can improve the slidability and a prolonged life is promised. In the second mode, the binder raises its temperature gradually and experiences the softening temperature for a relatively long time, in the event that ceramics such as $Al_2O_3 \cdot TiC$ having a large coefficient of thermal conductivity of 0.04 cal/cm·sec·°C. is used for the substrate. Consequently, the binder adheres to the magnetic head, attended with a head crash phenomenon, and the prolongation of life cannot be promised.

Therefore, it is expected that the provision of a magnetic head exhibiting the aforementioned first mode may solve the prior art problems.

A first embodiment of this invention will now be described specifically.

In the magnetic tape device, rapid start/stop operations are repeated to feed the magnetic tape in order to carry out read/write of data. During the start/stop operations, a transient phenomenon is observed wherein the magnetic tape vibrates and collides against the magnetic head. In the magnetic disc device, on the other hand, the magnetic disc rotates normally with a slight floating gap preserved between the magnetic disc and the magnetic head. But, because of intrusion of external dusts into the gap or existence of irregular projections on the magnetic disc, the magnetic disc serving as recording medium collides against the magnetic head, as in the case of the magnetic tape. In this embodiment, this phenomenon is taken into consideration, and the surface of the magnetic head opposing the recording medium is made of various materials, for measurement of sliding characteristics of individual materials under artificial collision of the respective magnetic heads against the magnetic disc. To enhance the collision phenomenon between the magnetic head and the magnetic disc, the magnetic head is caused to float above the magnetic disc which is rotating at a peripheral speed of 38.7 m/sec, so that the magnetic head is brought into a vibratory motion of 70 G at 80 Hz. With materials shown in Table 1 which are used for the slider of the magnetic head, measurement results as shown in FIG. 3 were obtained.

TABLE 1

| Slider materials | Coefficient of thermal conductivity (cal/cm · sec · °C.) |
|---|---|
| $ZrO_2$ (zirconia) | 0.005 |
| Glass ceramics | 0.006 |
| NiZn ferrite | 0.008 |
| Mn.Zn ferrite | 0.014 |
| $Al_2O_3.TiO_2$ (alumina titania) | 0.03 |
| $Al_2O_3.TiC$ (alumina titanium carbide) | 0.04 |
| SiC based ceramics | 0.1 |
| Si.SiC (silicon · silicon carbide) | 0.14 |

Figure 3:
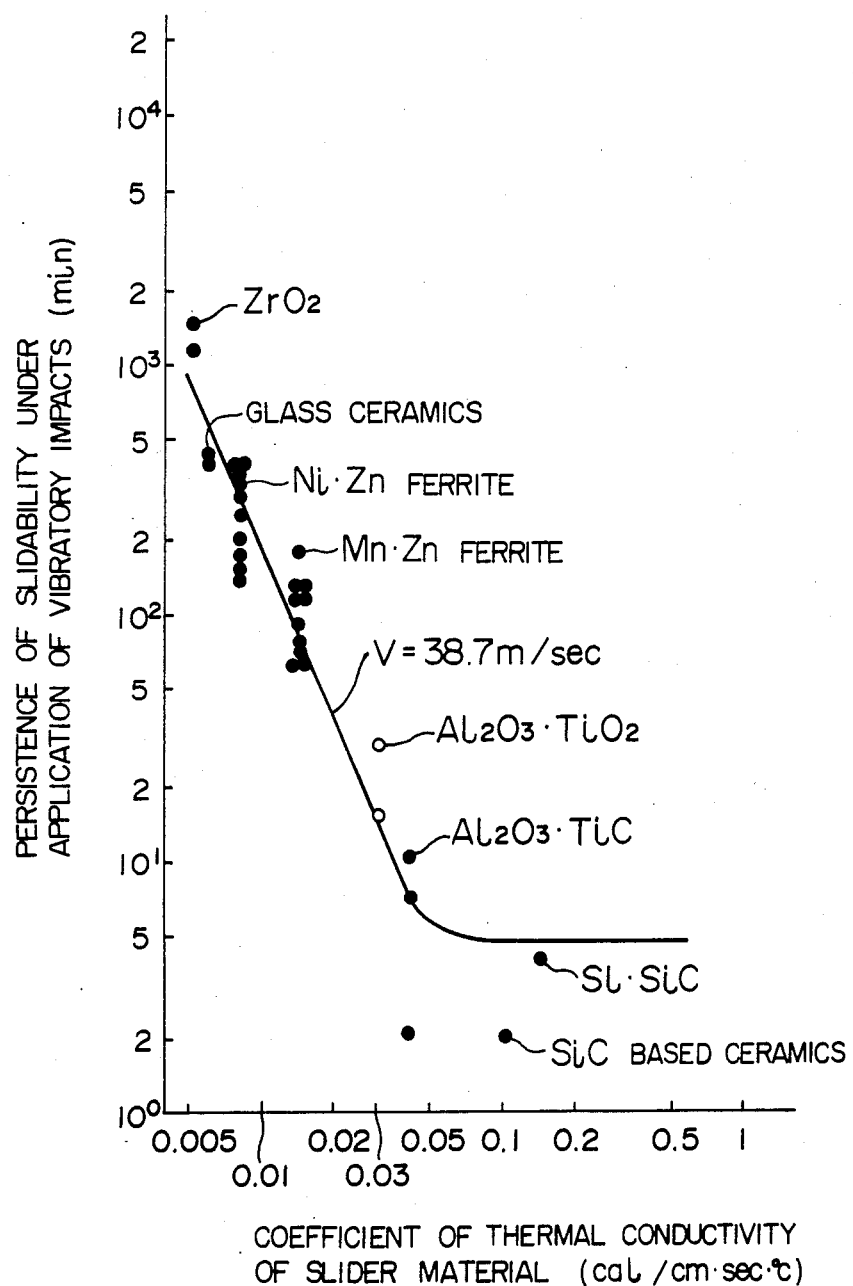
FIG. 3 is a graph showing persistence of slidability according to a first embodiment of this invention.

FIG. 3 shows the coefficient of thermal conductivity of the slider material on abscissa and, on ordinate, persistence of slidability (time) under the application of vibratory impacts. As will be seen from FIG. 3, the smaller the coefficient of thermal conductivity, the more the persistence of slidability of the various materials increases, proving that the aforementioned physical phenomenon plays an important role in improving the sliding characteristics. It will also be appreciated from FIG. 3 that the materials having a coefficient of thermal conductivity of 0.03 cal/cm·sec·°C. or less exhibit excellent sliding characteristics.

Other materials than those shown in Table 1 may also be used, provided that they have a coefficient of thermal conductivity of 0.03 cal/cm·sec·°C. or less, including single substance metal or an alloy; single substance, mixture or compound of oxide, carbide, nitride, boride or sulfide of the single substance metal or alloy; or materials containing these constituents.

The first embodiment of this invention set forth thus far may be modified as will be described below.

In addition to the wear-proof properties or the sliding characteristics, the substrate for thin film head is required to satisfy such conditions that the substrate must have rigidity sufficient for reducing its flexure due to internal stress caused upon the formation of the thin film element on the substrate, that the substrate must have chemicals-proof properties against chemicals used in the element formation process, and that the substrate must have good mechanical machining properties which assist in machining the substrate into the sliding surface acting as the magnetic head. To meet these requirements, in a modified embodiment of this invention, the nature of the typical ceramics shown in Table 1 may be altered by adding various additives to such an extent that resulting ceramics will not have a coefficient of thermal conductivity which exceeds 0.03 cal/cm·sec·°C.

Further, in accordance with teachings of the present invention, the nature of only the sliding surface of the thin film head substrate may be changed locally so as to reduce its coefficient of thermal conductivity by utilizing a known measure to this end; the sliding surface may be deposited, to a small thickness, with a material having a low coefficient of thermal conductivity by coating, vapor deposition or sputtering; or a protective plate mating the substrate formed with the magnetic head element to form the sliding surface may be applied with a similar treatment to that described just above.

The point of a second embodiment of the present invention will now be described in view of physical phenomena taking place therein.

Figure 4:
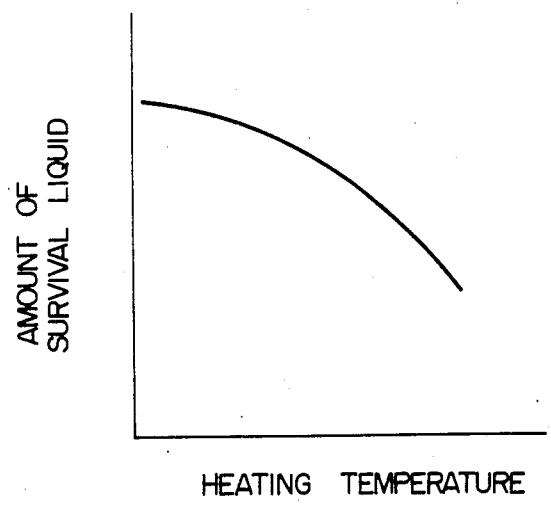
FIG. 4 is a graph useful in explaining a second embodiment of this invention.

Heat is generated by sliding friction between the magnetic tape or disc and the magnetic head, as described previously. The binders of the magnetic tape and magnetic disc are set through difference processes but generally, when the binders are re-heated after setting, they are softened within a temperature range as shown in FIG. 2 and this softening temperature range depends on the kind and polymerization grade of the binders. Especially, in the case of the magnetic disc having a surface applied with liquid lubricant, heat generated by the sliding friction causes the liquid lubricant to volatize. The liquid lubricant applied on the magnetic disc surface has a temperature characteristic as shown in FIG. 4 indicating that the amount of survival lubricant decreases as heating temperature increases.

Accordingly, in the magnetic tape memory device in which the magnetic tape and the magnetic head are in constant contact with each other during sliding, it is a matter of importance to suppress the heat generation due to sliding friction to such an extent that the magentic tape binder will not be softened.

In the magnetic disc memory device, collision also occurs between the magnetic disc and the magnetic head and a similar problem as in the precedence is encountered. Especially, with the magnetic disc surface applied with liquid lubricant, it is of significance to suppress the heat generation due to collision of the magnetic disc against the magnetic head to such an extent that the amount of volatized liquid lubricant is appreciably small.

In the second embodiment, the surface of the magnetic head opposing the recording medium, that is, magnetic disc is made of various materials, for measurement of sliding characteristics of individual materials under artificial collision of the respective magnetic heads against the magnetic head. To enhance the collision phenomenon between the magnetic head and the magnetic disc, the magnetic head is caused to float above the magnetic disc which is rotating at a peripheral speed of 16 m/sec, so that the magnetic head is brought into a vibratory motion of 70 G at 80 Hz. With materials shown in Table 2 which are used for the slider of the magnetic head, measurement results as shown in FIG. 5 were obtained.

TABLE 2

| Slider materials | Coefficient of thermal conductivity (cal/cm · sec · °C.) |
|---|---|
| $ZrO_2$ | 0.005 |
| Glass ceramics | 0.006 |
| Ni.Zn ferrite | 0.008 |
| Mn.Zn ferrite | 0.014 |
| $Al_2O_3.TiO_2$ | 0.03 |
| $Al_2O_3.TiC$ | 0.04 |
| SiC based ceramics | 0.1 |
| SiC based ceramics | 0.14 |
| Si | 0.2 |
| SiC based ceramics | 0.65 |

Figure 5:
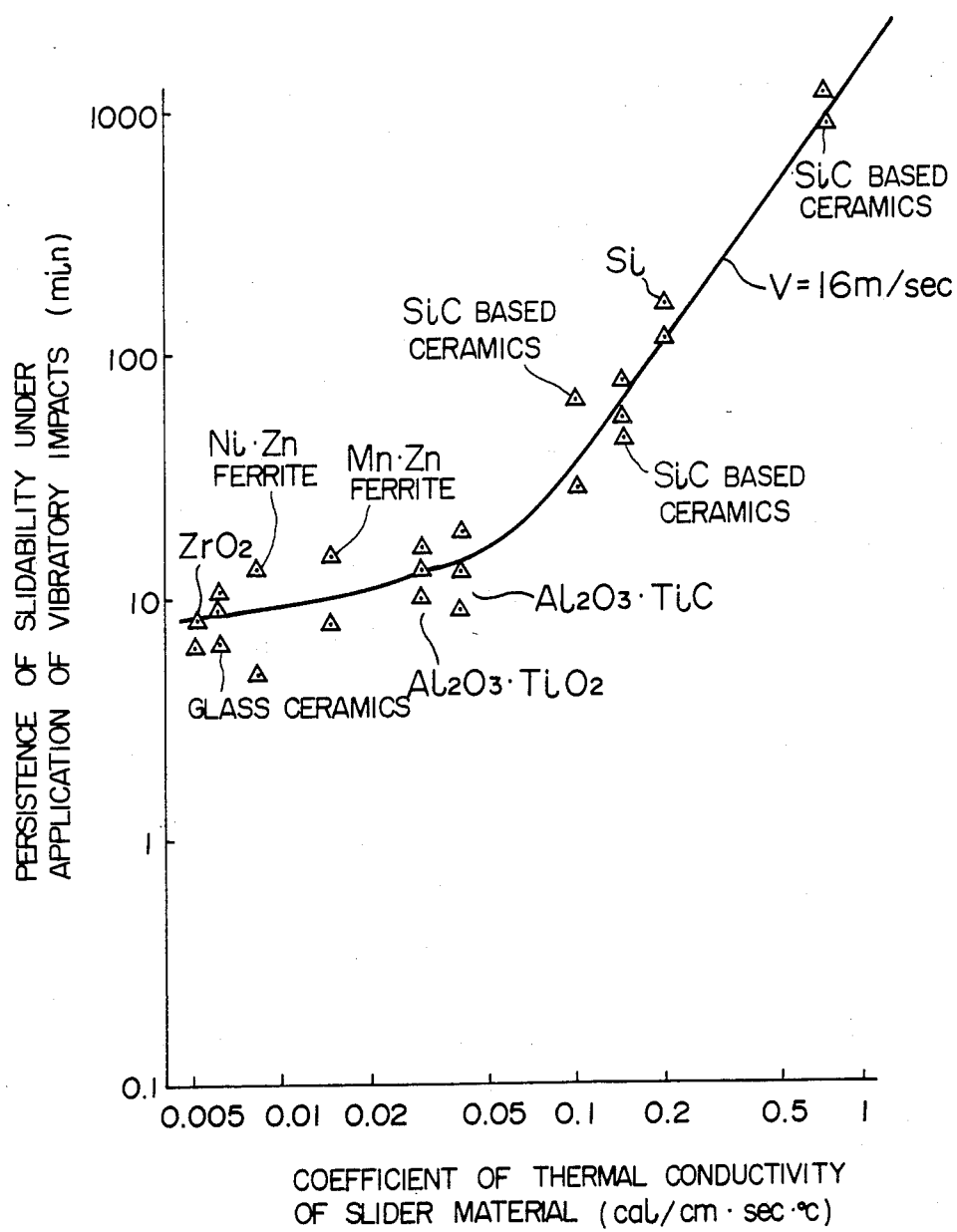
FIG. 5 is a graph showing persistence of slidability according to a second embodiment of this invention.

FIG. 5 shows, on abscissa, the coefficient of thermal conductivity of the slider material and, on ordinate, persistence of slidability (time) under the application of vibratory impacts. As will be seen from FIG. 5, the persistence of slidability of the respective materials greatly depends on the magnitude of the coefficient of thermal conductivity. It will also be appreciated from FIG. 5 that the materials having a coefficient of thermal conductivity of 0.1 cal/cm·sec·°C. or more exhibit excellent sliding characteristics.

Other materials than those shown in Table 2 may also be used, provided that they have a coefficient of thermal conductivity of 0.1 cal/cm·sec·°C. or more, including single substance metal or an alloy; single substance, mixture or compound of oxide, carbide, nitride, boride or sulfide of the single substance metal or alloy; or materials containing these constituents.

The second embodiment of this invention set forth thus for may be modified as will be described below.

In addition to the improved wear-proof properties or sliding characteristics, the substrate for thin film head is required to satisfy such conditions that the substrate must have rigidity sufficient for reducing its flexure due to internal stress caused upon the formation of the thin film element on the substrate, that the substrate must have chemical-proof properties against chamicals used in the element formation process, and that the substrate must have good mechanical machining properties which assist in machining the substrate into the sliding surface acting as the magnetic head. To meet these requirements, in a modification of the second embodiment of this invention, the typical ceramics shown in Table 2 may be improved by adding various additives to such an extent that resulting ceramics will not have a coefficient of thermal conductivity which falls below 0.1 cal/cm·sec·°C.

Further, the alternations as applied to the first embodiment are also applicable to the second embodiment. More specifically, the nature of only the sliding surface of the thin film head substrate may be changed locally so as to reduce its coefficient of thermal conductivity by utilizing a known measure to this end; the sliding surface may be deposited, to a small thickness, with a material having a large coefficient of thermal conductivity by coating, vapor deposition or sputtering; or a protective plate mating the substrate formed with the magnetic head element to form the sliding surface may be applied with a similar treatment to that described just above.

What is claimed is:

1. In a thin film magnetic head having a thin film on a substrate to form a magnetic circuit associated with a recording medium, the improvement wherein at least a sliding surface of said substrate opposing said recording medium is made of a material having a coefficient to thermal conductivity which is sufficient to carbonize a binder of said recording medium when said magnetic head slides on said recording medium; said material consisting essentially of $ZrO_2$.

2. A thin film magnetic head according to claim 1 wherein said material consists of $ZrO_2$.

3. A thin film magnetic head according to claim 1 wherein the coefficient of thermal conductivity of said material is less than 0.03 cal/cm·sec·°C.

* * * * *